Patented July 21, 1936

2,047,961

UNITED STATES PATENT OFFICE 2,047,961

PROCESS OF FORMING A PROLAMINE-BASE FLEXIBLE SHEET MATERIAL

Donald W. Hansen, Decatur, Ill., assignor, by mesne assignments, to Prolamine Products Incorporated, Dover, Del., a corporation of Delaware No Drawing. Application September 23, 1932, Serial No. 634,618

4 Claims. (Cl. 18—57)

This invention relates to transparent films adapted for the wrapping of packages and for other uses, such, for example, as coatings upon various articles, cartons, paper sheets, etc. and has for its object broadly the provision of an improved film well adapted to resist water and substantially moisture-proof which may be produced economically and through the use of ingredients generally available in large quantities and obtainable at low costs.

The invention has for a principal object the provision of a film of the character described of high water resistant characteristics and substantially moisture-proof.

Another and separate object of the invention is the provision of a film of the character described which will be moisture-proof in its body as well as upon its surface or surfaces.

The invention contemplates the manufacture of a water resistant and moisture-proof film from a vegetable protein preferably the prolamine zein as a body material and the employment of a phenol-formaldehyde type resin such as bakelite as a water and moisture-proofing material. While this material may be applied to the finished sheet as a coating or varnish, it is believed desirable to incorporate the resin in intimate mixture with the material forming the sheet so that the body as well as the surfaces are resistant to water and the passage of moisture.

Zein is a material derived from corn gluten by dissolving the corn gluten in a mixture of alcohol and water. Since this process of extracting zein from gluten forms no part of the invention, particular description of this extraction will not here be undertaken.

As a result of such extraction a zein solution preferably of about 12 percent zein in a combination of solvents generally consisting of 70 percent alcohol and 30 percent water is preferably provided. To this is added a plasticizer for the zein, such, for example, as glycerol in the ratio of 15 parts of glycerol to 100 parts of zein on a dry substance basis. To this a tanning agent is added and this may conveniently be 10 parts of gaseous formaldehyde in the form of a commercial aqueous solution and 15 parts ethylene glycol monoethyl ether (cellosolve).

The materials so mixed are refluxed for one-half hour to promote reaction between the formaldehyde and the zein and then 10 parts of an alcohol soluble phenol-formaldehyde type resin are added and 5 parts of hexamethylene-tetramine and 5 parts of a resin plasticizer such as alpha chloro naphthalene are added.

The resulting mixture is thoroughly stirred and is poured on glass plates or cast on slowly moving metal belts. The temperature is first raised to 75° C. to hasten evaporation of the solvent and the resulting film is stripped from the glass plate or belt and heated to 125° C. to harden the resin. The alcohol-soluble phenol-formaldehyde type of resin is not a finally reacted or hardened insoluble form of resin. It is capable of further reaction, as in the presence of hexamethylene tetramine, to form the insoluble type of finally hardened resin by use of heat. It is therefore apparent that the finally reacted phenol-formaldehyde type of resin is produced in situ in the film in the presence of zein or prolamine, and in the presence of plasticizer for zein, and of plasticizer for the resin.

The resin acts as a water resistant and moisture-proofing material and the resultant film is or may be transparent, thin and flexible.

It is thought that the invention and many of its attendant advantages will be understood from the foregoing without further description and it will be apparent that various changes may be made in the ingredients, in their proportions, and in the steps of producing the film without departing from the spirit or scope of the invention or sacrificing all of its material advantages. The form hereinbefore described being merely a preferred embodiment thereof. Certain matters herein disclosed are further described and claimed in my copending application Serial No. 752,537, filed November 10, 1934, as a continuation in part of this application.

I claim:

1. The process of forming a transparent flexible wrapping material, which comprises dissolving a prolamine in an aqueous-alcoholic solution, reacting said prolamine with formaldehyde, mixing an alcohol soluble phenol-formaldehyde type resin with the reaction product of said prolamine and formaldehyde, adding a plasticizer, and forming the resultant mixture into a thin sheet.

2. The process of forming a flexible wrapping material, which comprises dissolving a prolamine in an aqueous-alcohol solution, reacting said prolamine with formaldehyde, mixing an alcohol-soluble phenol-formaldehyde type resin with the reaction product of said prolamine and formaldehyde, adding plasticizer, forming the resultant mixture into a thin sheet, and treating the sheet to finally harden the phenol-formaldehyde type resin.

3. The process of forming a flexible wrapping material, which comprises dissolving a prolamine in an aqueous-alcohol solution, reacting said prolamine with formaldehyde, mixing an alcohol-soluble phenol-formaldehyde type resin with the reaction product of said prolamine and formaldehyde, adding plasticizer for the prolamine and plasticizer for the resin, forming the resultant mixture into a thin sheet, and treating the sheet to finally harden the phenol-formaldehyde type resin.

4. The process of forming a flexible sheet material which comprises dissolving a prolamine and glycerol in an aqueous-alcohol solution, reacting said mixture with formaldehyde, mixing an alcohol-soluble phenol-formaldehyde type of resin and plasticizer therefor with the product of the reaction with the formaldehyde, forming the resultant mixture into a thin sheet, and treating the sheet to finally harden the phenol-formaldehyde type of resin.

DONALD W. HANSEN.